(12) United States Patent
Bai

(10) Patent No.: US 9,500,259 B1
(45) Date of Patent: Nov. 22, 2016

(54) HIGH PERFORMANCE TORSIONAL VIBRATION ISOLATOR

(71) Applicant: GM Global Technology Operations LLC, Detroit, MI (US)

(72) Inventor: Shushan Bai, Ann Arbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/823,556

(22) Filed: Aug. 11, 2015

(51) Int. Cl.
*F16H 57/08* (2006.01)
*F16F 15/12* (2006.01)
*F16H 45/02* (2006.01)

(52) U.S. Cl.
CPC ........... *F16F 15/1206* (2013.01); *F16H 45/02* (2013.01); *F16H 2045/0268* (2013.01)

(58) Field of Classification Search
None
See application file for complete search history.

(56) References Cited

U.S. PATENT DOCUMENTS

| | | | |
|---|---|---|---|
| 2,855,802 A | 10/1958 | Gorsky | |
| 2,995,956 A | 8/1961 | Moore | |
| 4,252,226 A | 2/1981 | Staub | |
| 4,291,790 A | 9/1981 | Staub | |
| 4,398,436 A | 8/1983 | Fisher | |
| 4,573,374 A | 3/1986 | Koshimo et al. | |
| 4,676,121 A | 6/1987 | Kouno | |
| 4,800,996 A | 1/1989 | Loizeau | |
| 5,551,928 A * | 9/1996 | Sudau | F16F 15/1206 192/70.17 |
| 5,634,866 A | 6/1997 | Sudau | |
| 5,713,813 A | 2/1998 | von Greyerz | |
| 5,716,300 A | 2/1998 | Sammataro et al. | |
| 5,733,218 A * | 3/1998 | Sudau | F16F 15/1206 192/70.17 |
| 5,735,768 A * | 4/1998 | Sudau | F16F 15/1206 192/70.17 |
| 5,766,109 A | 6/1998 | Sudau | |
| 5,816,973 A | 10/1998 | Sudau et al. | |
| 5,836,217 A | 11/1998 | Sudau et al. | |
| 5,863,274 A | 1/1999 | Jackel | |
| 5,878,856 A | 3/1999 | Sudau et al. | |
| 5,967,939 A | 10/1999 | Reik et al. | |
| 5,976,048 A | 11/1999 | Sudau et al. | |
| 6,003,650 A * | 12/1999 | Kleifges | F16F 15/13157 192/70.17 |
| 6,019,683 A | 2/2000 | Sudau | |
| 6,058,801 A | 5/2000 | Schierling et al. | |
| 6,058,802 A | 5/2000 | Sudau et al. | |
| 6,099,434 A | 8/2000 | Sasse et al. | |
| 6,102,174 A | 8/2000 | Sasse | |
| 6,126,568 A | 10/2000 | Sudau | |
| 6,200,222 B1 | 3/2001 | Sudau | |

(Continued)

FOREIGN PATENT DOCUMENTS

| DE | 3139658 A1 | 4/1983 |
|---|---|---|
| DE | 3423210 A1 | 4/1985 |

(Continued)

*Primary Examiner* — Dirk Wright

(57) ABSTRACT

A torsional vibration isolator for a motor vehicle includes an input member having an engine drive component. An output member defines a transmission input shaft. A component group connecting the input member to the output member includes a first spring engagement element connected to a ring gear. At least one pinion gear is engaged to the ring gear. A sun gear is engaged to the at least one pinion gear. A second spring engagement element is connected to a carrier, the carrier also connected to the at least one pinion gear. At least one spring contacts both the second spring engagement element and the first spring engagement element to permit the second spring engagement element and the carrier to angularly deflect with respect to the first spring engagement element.

20 Claims, 4 Drawing Sheets

(56) References Cited

U.S. PATENT DOCUMENTS

| | | |
|---|---|---|
| 6,230,862 B1 | 5/2001 | Reik et al. |
| 6,231,472 B1 | 5/2001 | Sudau et al. |
| 6,354,974 B1 | 3/2002 | Kozarekar |
| 6,398,655 B1 | 6/2002 | Orlamunder et al. |
| 6,435,998 B1 | 8/2002 | Sudau et al. |
| 6,439,362 B2 | 8/2002 | Reik et al. |
| 6,591,705 B1 | 7/2003 | Reik et al. |
| 6,695,109 B2 | 2/2004 | Wack et al. |
| 6,758,315 B2 | 7/2004 | Bauer et al. |
| 6,799,665 B1 | 10/2004 | Sasse et al. |
| 6,832,672 B2 | 12/2004 | Bauer et al. |
| 6,887,180 B2 | 5/2005 | Pels et al. |
| 6,962,533 B2 | 11/2005 | Zottmann et al. |
| 7,073,646 B2 | 7/2006 | Sasse et al. |
| 7,108,626 B2 | 9/2006 | Friedmann |
| 7,114,585 B2 | 10/2006 | Man et al. |
| 7,143,879 B2 | 12/2006 | Ackermann et al. |
| 7,261,665 B2 | 8/2007 | Friedmann et al. |
| 7,267,212 B2 | 9/2007 | Wack et al. |
| 7,287,634 B2 | 10/2007 | Agner et al. |
| 7,484,607 B2 | 2/2009 | Schneider et al. |
| 7,523,817 B2 | 4/2009 | Forster |
| 7,530,223 B2 | 5/2009 | Ender et al. |
| 7,604,542 B2 | 10/2009 | Bach et al. |
| 7,648,009 B2 | 1/2010 | Wack et al. |
| 7,651,399 B2 | 1/2010 | Wack |
| 7,662,043 B2 | 2/2010 | Schmid et al. |
| 7,743,900 B2 | 6/2010 | Breier |
| 7,993,204 B2 | 8/2011 | Dogel |
| 8,075,410 B2 | 12/2011 | Carlson et al. |
| 8,313,385 B2 | 11/2012 | Mundt et al. |
| 9,303,744 B2 * | 4/2016 | Dogel ................ F16F 15/1478 |
| 2010/0216555 A1 | 8/2010 | Le Moal |
| 2011/0143843 A1 | 6/2011 | Yamamoto et al. |
| 2013/0269475 A1 | 10/2013 | Le Moal |
| 2014/0162834 A1 | 6/2014 | Dogel et al. |

FOREIGN PATENT DOCUMENTS

| | | |
|---|---|---|
| DE | 3630398 A1 | 5/1987 |
| DE | 3612583 A1 | 10/1987 |
| DE | 3624496 A1 | 1/1988 |
| DE | 3624498 A1 | 1/1988 |
| DE | 3834284 A1 | 4/1990 |
| DE | 3926384 A1 | 2/1991 |
| DE | 3934798 A1 | 4/1991 |
| DE | 4121586 A1 | 1/1993 |
| DE | 4128868 A1 | 3/1993 |
| DE | 4333562 A1 | 4/1994 |
| DE | 4444196 A1 | 6/1995 |
| DE | 19514411 A1 | 11/1995 |
| EP | 0041708 A2 | 12/1981 |
| EP | 0086044 A1 | 8/1983 |
| EP | 0533426 A2 | 3/1993 |
| FR | 2782766 A1 | 3/2000 |
| GB | 2220464 A | 10/1990 |
| GB | 2285109 A | 6/1995 |
| GB | 2292596 A | 2/1996 |
| GB | 2320534 A | 6/1998 |
| JP | S602249 A | 1/1985 |
| WO | WO2006082455 A1 | 8/2006 |

* cited by examiner

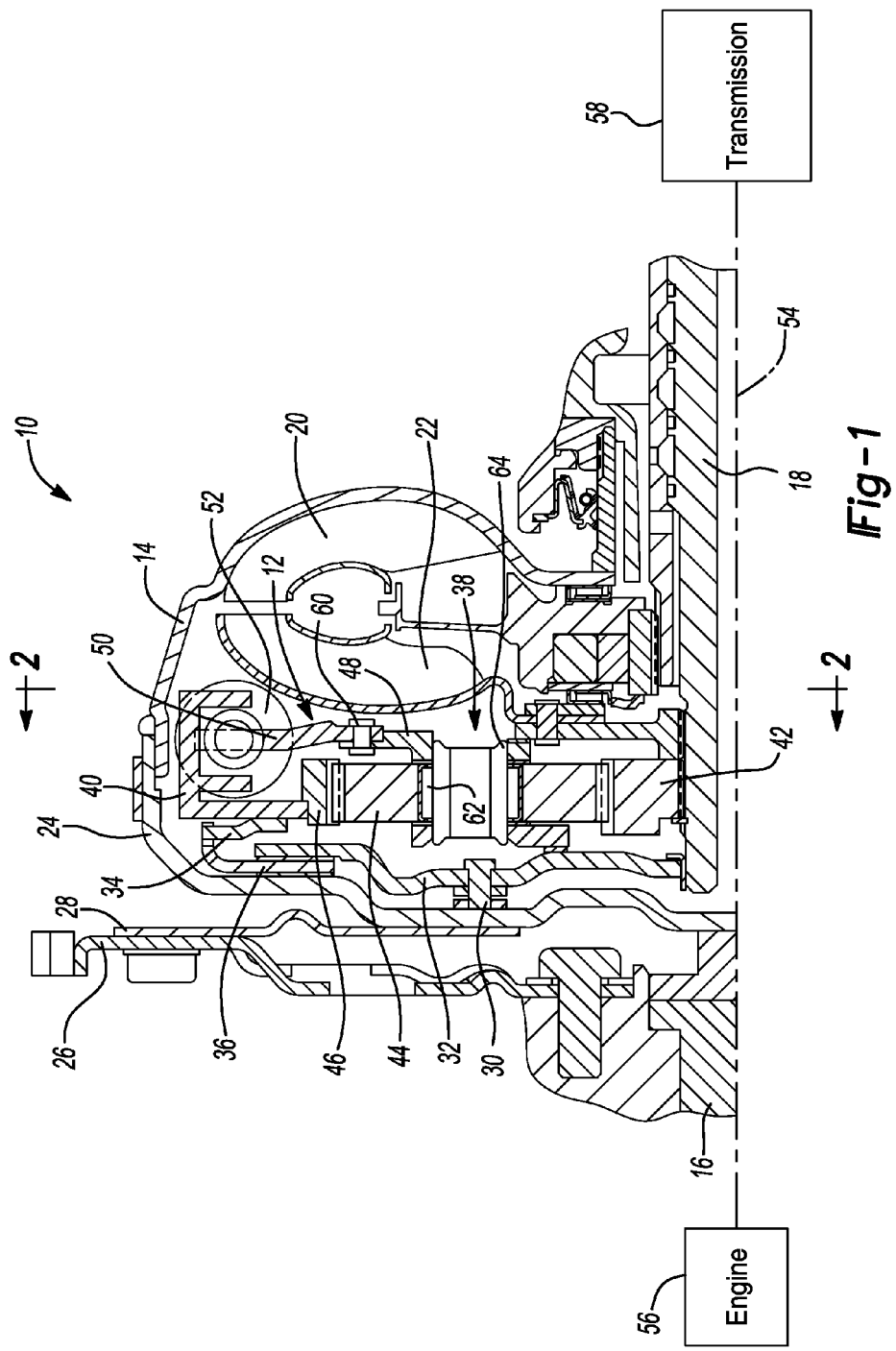

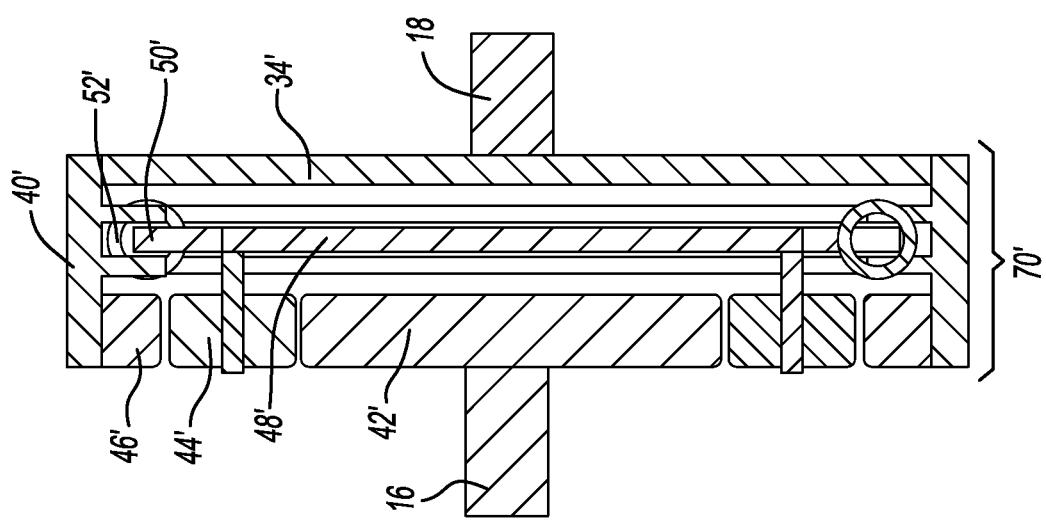

HIGH PERFORMANCE TORSIONAL VIBRATION ISOLATOR

FIELD

The present disclosure relates to a powertrain having a torsional vibration isolator or damper, and more particularly to a powertrain having a planetary gear set incorporated into a vibration isolator in order to reduce torsional vibration between an output of an engine and an input of a transmission.

BACKGROUND

The statements in this section merely provide background information related to the present disclosure and may or may not constitute prior art.

Motor vehicle engines produce torsional vibration that is undesirable to transmit through the powertrain and driveline to the motor vehicle. Typically, a torsional isolator or damper is used to isolate or reduce the torsional vibration transmitted from the engine to the transmission. The torsional isolator can be placed within a torque converter between a torque converter lock up clutch and an input shaft of the transmission. Known torsional isolators use one or more springs to store energy and used to dampen an energy transfer path between the engine and the transmission. However, in certain powertrain configurations the torsional isolator is insufficient to isolate the torsional vibrations. For example, in powertrains having continuous engine torque pulsation, an increase in vibrational magnitude and a decrease in vibrational frequency occur which the known spring design vibration isolators are insufficient to isolate, thereby requiring improvement over known vibration isolators.

Accordingly, there is room in the art for a powertrain having a vibration isolator that reduces torsional vibration due to continuous engine torque pulsation.

SUMMARY

The present disclosure provides an example of a torsional vibration isolator for a motor vehicle. The torsional vibration isolator for a motor vehicle includes an input member, an output member; and a component group connecting the input member to the output member. The component group includes: a first spring engagement element connected to a ring gear; at least one pinion gear is engaged to the ring gear; a sun gear is engaged to the at least one pinion gear; a second spring engagement element is connected to a carrier, with the carrier also connected to the at least one pinion gear; and at least one spring contacts both the second spring engagement element and the first spring engagement element to permit the carrier to angularly deflect with respect to the first spring engagement element. Both the sun gear and the ring gear are connected to either the input member or the output member.

In one example of the torsional vibration isolator for a motor vehicle of the present disclosure, the input member is an engine drive component.

In yet another example of the torsional vibration isolator for a motor vehicle of the present disclosure, the output member is a transmission input shaft.

In yet another example of the torsional vibration isolator for a motor vehicle of the present disclosure, the sun gear is directly connected to the transmission input shaft.

In yet another example of the torsional vibration isolator for a motor vehicle of the present disclosure, a connection plate is directly connected to the first spring engagement element and connected to the engine drive component.

In yet another example of the torsional vibration isolator for a motor vehicle of the present disclosure, the torque converter includes a torque converter lock up clutch.

In yet another example of the torsional vibration isolator for a motor vehicle of the present disclosure, a torque converter lock-up clutch plate is connected to the connection plate; and a torque converter lock-up clutch piston is connected to the torque converter lock-up clutch plate between the engine drive component and the torque converter lock-up clutch plate.

In yet another example of the torsional vibration isolator for a motor vehicle of the present disclosure, the sun gear is connected to the engine drive component.

In yet another example of the torsional vibration isolator for a motor vehicle of the present disclosure, the first spring engagement element is connected to the transmission input shaft.

In yet another example of the torsional vibration isolator for a motor vehicle of the present disclosure, the input member is connected to a flex plate, and the flex plate is connected to a motor vehicle engine.

Further areas of applicability will become apparent from the description provided herein. It should be understood that the description and specific examples are intended for purposes of illustration only and are not intended to limit the scope of the present disclosure.

DRAWING

The drawings described herein are for illustration purposes only and are not intended to limit the scope of the present disclosure in any way.

FIG. 1 is a cross sectional view of a motor vehicle torque converter according to the principles of the present disclosure;

FIG. 6 is a diagrammatic presentation of a torsional vibration isolator of a second aspect of the disclosure.

DETAILED DESCRIPTION

Figure 3:
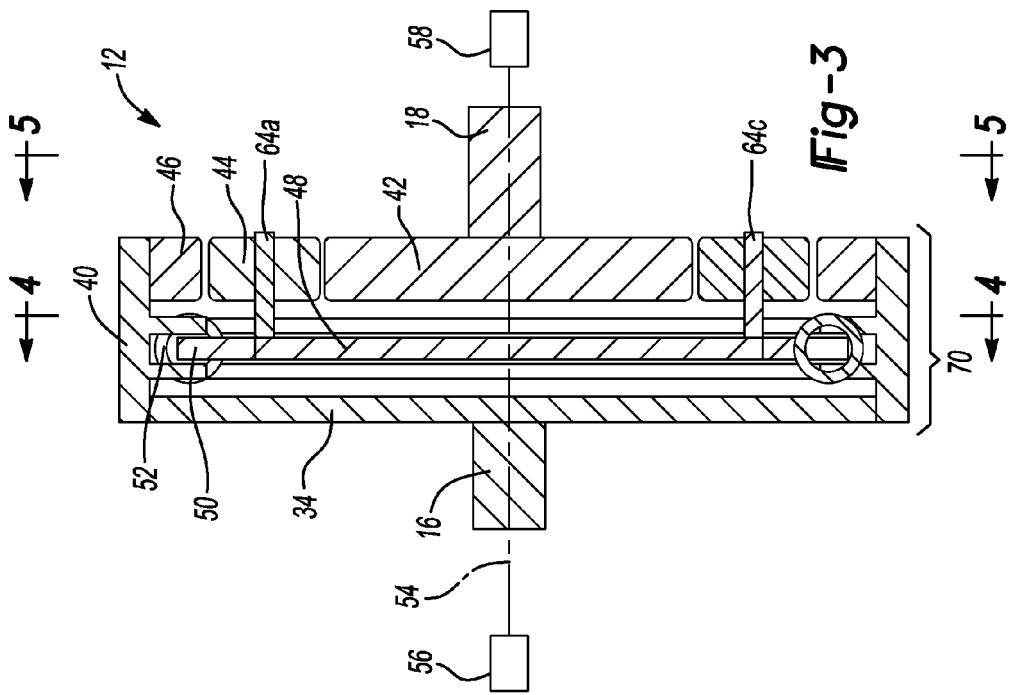
FIG. 3 is a diagrammatic cross sectional presentation of a torsional vibration isolator of a first aspect of the disclosure.

The following description is merely exemplary in nature and is not intended to limit the present disclosure, application, or uses.

With reference to FIG. 1, a transmission-drive system 10 for a motor vehicle includes a torsional vibration isolator 12 positioned within a torque converter 14, the torsional vibration isolator 12 used to isolate engine torque pulsations between an engine drive component 16 and a transmission input shaft 18.

The torque converter 14 generally includes a pump 20, a turbine 22, and a stator (not shown) positioned within a torque converter housing 24. The pump 20 is coupled to the torque converter housing 24 and driven by the engine drive component 16 such as a propeller shaft. The turbine 22 is fluidly driven by rotation of the pump 20. The stator is located between the pump 20 and the turbine 22 and is used to multiply torque within the torque converter 14. The torque converter housing 24 is flexibly connected to an engine interface 26, for example by fasteners through a flex plate 28. The torque converter 14 also includes a lock-up clutch 30 that is operable to selectively mechanically couple the pump 20 to the turbine 22 using a lock-up clutch piston 32 connected to a lock-up clutch plate 36. The input to the torsional vibrational isolator 12 is provided through a connection plate 34 fixed to the lock-up clutch plate 36.

The torsional vibration isolator 12 is coupled between the connection plate 34 and the transmission input shaft 18 in order to reduce torsional vibration in a path between the engine drive component 16 and the transmission shaft 18. The connection plate 34 is fixed to a first spring engagement element 40 for example by welding. To increase the effective range of torsional vibration reduction, the torsional vibrational isolator 12 includes a planetary gear set 38. Components of the planetary gear set 38 include a sun gear 42, multiple pinion gears 44, and a ring gear 46.

The sun gear 42 has internal gear teeth meshing with a spline gear of the transmission input shaft 18. The multiple pinion gears 44 individually rotating about the sun gear 42 each have external gear teeth meshing with external gear teeth of the sun gear 42. The external gear teeth of each of the pinion gears 44 are also meshed to internal gear teeth of the ring gear 46 which is positioned having the pinion gears 44 internal to the ring gear 46. The pinion gears 44 are individually rotatably mounted to separate pinion shafts (shown and described in greater detail in reference to FIG. 2) that are fixed to a carrier 48 (described in greater detail below). According to several aspects, the torsional vibrational isolator 12 together with the torque converter 14 are each connected to the transmission input shaft 18, and therefore both co-rotate as the torque converter 14 transfers power from the engine drive component to rotate the transmission input shaft 18.

A second spring engagement element 50 connected to the carrier 48 contacts one or more springs 52. The multiple springs 52, which according to several aspects are compression springs, are positioned between and are compressed by relative angular rotation between the second spring engagement element 50 and the first spring engagement element 40, as the first spring engagement element 40 angularly rotates with respect to the second spring engagement element 50. The second spring engagement element 50 is connected to the carrier 48 which as previously noted rotatably supports the pinion gears 44. Torsional vibration reduction is achieved in part by compression and subsequent expansion of the springs 52, which store the energy received by angular rotation between the first spring engagement element 40 and the second spring engagement element 50.

The first spring engagement element 40 is fixed to the ring gear 46. The second spring engagement element 50 is connected to the carrier 48 using multiple fasteners such as rivets 60. The carrier 48 rotates with respect to the transmission input shaft 18 and the planetary gear set 38, being restrained in its arc of rotation with respect to the first spring engagement element 40 by compression and expansion of the springs 52. To rotatably connect the pinion gears 44 to the carrier 48, a needle bearing 62 is positioned between each of the pinion gears 44 and a pinion shaft 64, which is connected to the carrier 48. The turbine 22 is coupled to and drives the transmission input shaft 18, therefore torque from an engine 56 is transferred through the torsional vibration isolator 12 and the transmission input shaft 18 to a transmission 58.

Figure 2:
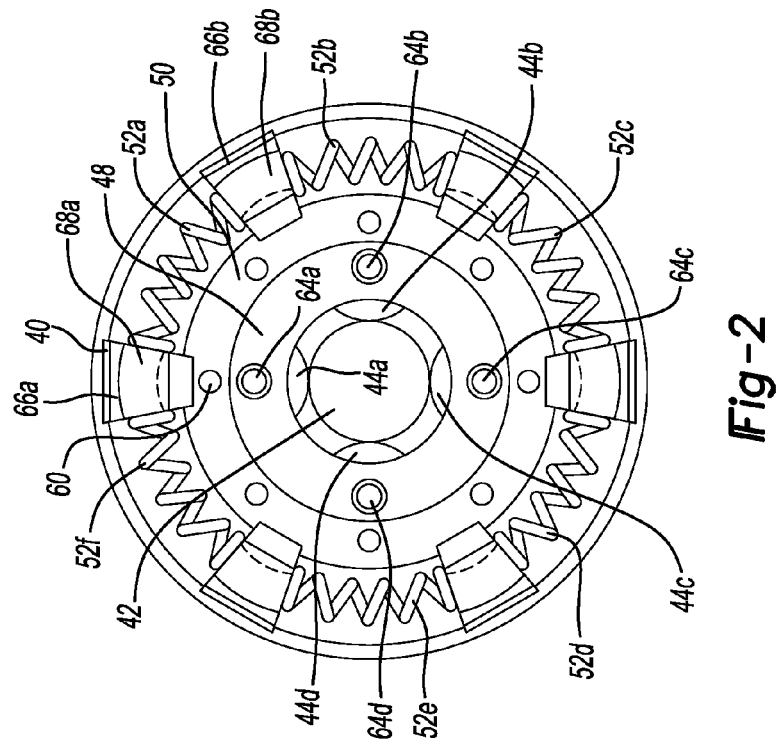
FIG. 2 is a partial cross sectional end elevational view taken at section 2 of FIG. 1.

Referring to FIG. 2, according to several aspects, the multiple springs 52 include six springs identified as springs 52a, 52b, 52c, 52d, 52e, 52f. Each of the springs 52 is separated from a successive spring 52 by a first engagement tongue 66 fixed to and extending radially inwardly from the first spring engagement element 40, and a second engagement tongue 68 fixed to and extending radially outwardly from the second spring engagement element 50. For example, spring 52a is retained between and contacts the first engagement tongue 66a and the second engagement tongue 68a at one end of the spring 52a, and also contacts the first engagement tongue 66b and the second engagement tongue 68b at an opposite second end of the spring 52a. Torsional rotation of the carrier 48 and thereby the second spring engagement element 50 (connected to the carrier 48) compresses each of the springs 52a, 52b, 52c, 52d, 52e, 52f against the individual first engagement tongues 66 of the first spring engagement element 40.

Referring to FIG. 3 and again to FIGS. 1-2, according to several aspects the input member of the torsional vibration isolator 12 is the engine drive component 16 connected via the connection plate 34 to the first spring engagement element 40, and the transmission input shaft 18 defines the output member. The first spring engagement element 40 is connected to and vibration isolated from the carrier 48 by the springs 52. The connection plate 34 is connected to the first spring engagement element 40 and thereby to the ring gear 46. The sun gear 42 is connected to the transmission input shaft 18, acting as the output member. Each of the pinion gears 44, which according to several aspects includes four pinion gears 44a, 44b, 44c, 44d are rotatably connected to the carrier 48 by the individual pinion shafts 64a, 64b, 64c, 64d. According to this aspect, the sun gear 42 and the ring gear 46 are connected to the output member (transmission input shaft 18), and isolated using the springs 52 via the carrier 48 from the input member (engine drive component 16).

Figure 4:
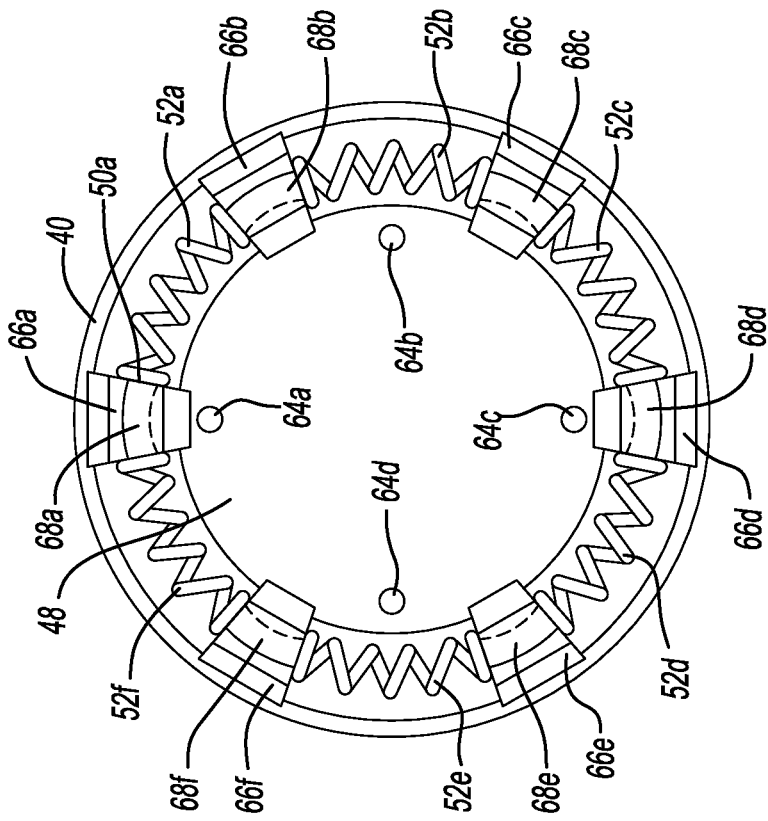
FIG. 4 is a partial cross sectional end elevational view taken at section 4 of FIG. 3.

Referring to FIG. 4 and again to FIGS. 1-2, the carrier 48 supports the pinion gears 44 using the individual pinion shafts 64a, 64b, 64c, 64d arranged in quadrants about the carrier 48. Six pairs of the engagement tongues, including first and second engagement tongue pairs (66a, 68a); (66b, 68b); (66c, 68c); (66d, 68d); (66e, 68e); and (66f, 68f) separate the individual springs 52a, 52b, 52c, 52d, 52e, 52f allowing simultaneous and substantially equal deflection of each of the springs 52a, 52b, 52c, 52d, 52e, 52f.

Figure 5:
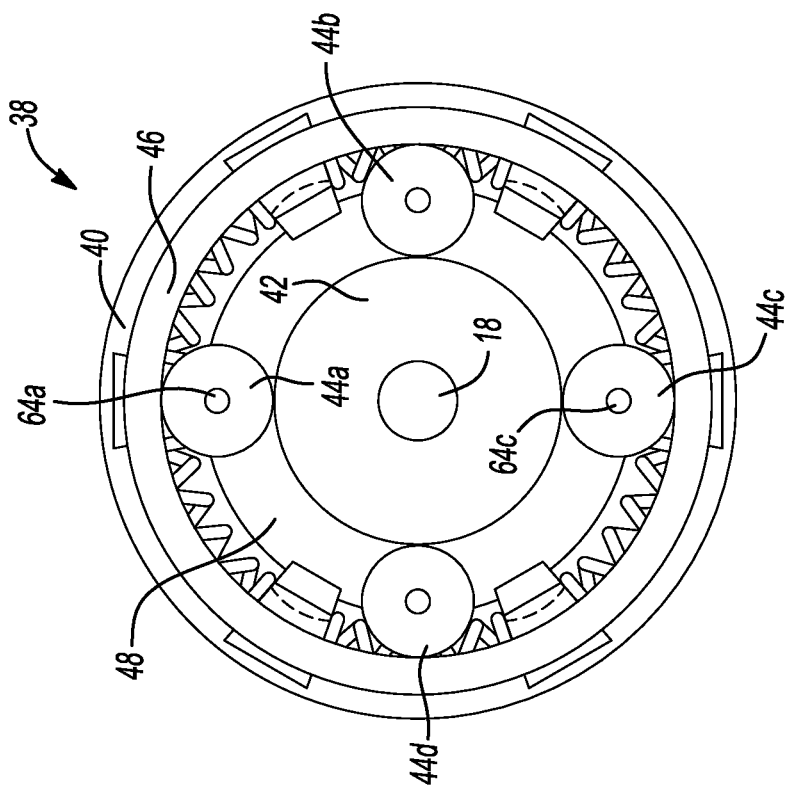
FIG. 5 is a partial cross sectional end elevational view taken at section 5 of FIG. 3.

Referring to FIG. 5 and again to FIGS. 1 and 3, the configuration of the planetary gear set 38 is more clearly visible. The sun gear 42 is centrally positioned, meshed with a spline gear of the transmission input shaft 18. Each of four pinion gears 44a, 44b, 44c, 44d are equally spaced and have their external gear teeth meshed with external gear teeth of the sun gear 42, as well as with internal facing gear teeth of the ring gear 46. According to this aspect, the sun gear 42, the pinion gears 44, and the ring gear 46 are on the output member side of the carrier 48.

Referring to FIG. 6 and again to FIGS. 1 and 3, a configuration of a torsional vibration isolator 12' is reversed with respect to the torsional vibration isolator 12 described in reference to FIGS. 1-5. Similar components are therefore identified using prime symbols. According to several aspects the input member of the torsional vibration isolator 12' is the engine drive component 16 connected to the sun gear 42', which in turn is connected to the pinion gears 44' and thereby to the ring gear 46'. The input member is isolated from the output member (transmission input shaft 18) by the springs 52' and the carrier 48', with the first spring engagement element 40' being connected to the transmission input shaft 18. The transmission input shaft 18 is torsional vibration isolated by the springs 52' and the carrier 48' from the sun gear 42' and the input member, connection plate 36. According to this aspect, the sun gear 42', the pinion gears 44', and the ring gear 46' are on the input member side of the carrier 48', and separated from the output member (transmission input shaft 18) by the carrier 48'.

It should also be appreciated that the torsional vibrational isolators 12, 12' may have other configurations, such as having fewer or greater than six springs, springs in parallel, and modifications with respect to the quantity of planet gears of the planetary gear set 38 without departing from the scope of the present disclosure.

According to several aspects of the present disclosure, a torsional vibration isolator 12 for a motor vehicle includes an input member such as the engine drive component 16, an output member such as the transmission input shaft 18; and a component group 70 connecting the input member to the output member. The component group 70 includes: the first spring engagement element 40 connected to the ring gear 46; at least one pinion gear 44 meshed to the ring gear 46; the sun gear 42 meshed to the at least one pinion gear 44; the second spring engagement element 50 connected to the carrier 48, with the carrier 48 also connected to the at least one pinion gear 44; and the at least one spring 52 contacts both the second spring engagement element 50 and the first spring engagement element 40 to permit the carrier 48 to angularly deflect with respect to the first spring engagement element 40. Both the sun gear 42 and the ring gear 46 are connected to either the input member or the output member.

As shown in FIG. 3, the component group 70 is configured such that the connection plate 34 is coupled to and driven by the engine drive component 16, and the sun gear 42 is connected to the transmission input shaft 18. As shown in FIG. 6, a component group 70' has substantially the same components as component group 70 but the components are reversed in their orientation with respect to the configuration of FIG. 3. Component group 70' is configured such that the sun gear 42' is connected to and driven by the engine drive component 16, and the connection plate 34' is connected to the transmission input shaft 18. In this aspect, the ring gear 46' is connected to the output member.

It is well known that to achieve more effective torsional vibration isolation it is desirable to reduce the spring coefficient and provide a larger maximum angular displacement between an input member such as an input shaft and an output member such as an output shaft of the vibration isolator. Known torsional vibration isolators using only springs to dampen torsional vibration are limited by the spring coefficient and spring length, and therefore have a limited angular displacement of the isolator components. By the additional use of the planetary gear set 38 described herein, together with the connection configuration of the component group 70, 70' components, a significant decrease in the spring coefficient and an increase in a maximum angular displacement of the isolator is achieved. This is demonstrated by the following two equations derived from the isolator design of the present disclosure:

$$k_{R\_S} = k_{spring} \times \frac{1}{\left(\frac{R}{S}+1\right)^2} \quad \text{Equation 1}$$

$$\theta_{max\_R\_S} = \theta_{max\_spring} \times \left(\frac{R}{S}+1\right) \quad \text{Equation 2}$$

In the above equations 1 and 2, $k_{R\_S}$ is the spring coefficient between input and output members of the isolator, (between the ring gear and the sun gear shafts), $k_{spring}$ is the spring coefficient of the spring assembly (all of the springs 52), R is the radius of the ring gear 46, S is the radius of the sun gear 42, $\theta_{max\_R\_S}$ is the maximum angular displacement between the input and the output members, and $\theta_{max\_spring}$ is the maximum angular displacement of the spring assembly. For example, using the above equations 1 and 2: if the planetary gear set 38 has an R/S ratio of 3, the spring coefficient of the isolator is decreased by approximately 16 times, and the maximum angular displacement is increased by 4 times.

The description of the invention is merely exemplary in nature and variations that do not depart from the general gist of the invention are intended to be within the scope of the invention. Such variations are not to be regarded as a departure from the spirit and scope of the invention.

What is claimed is:

1. A torsional vibration isolator for a motor vehicle, comprising:
   an input member;
   an output member;
   a component group connecting the input member to the output member, the component group including:
   a first spring engagement element connected to a ring gear;
   at least one pinion gear engaged to the ring gear;
   a sun gear engaged to the at least one pinion gear;
   a second spring engagement element connected to a carrier, the carrier also connected to the at least one pinion gear; and
   at least one spring contacting both the second spring engagement element and the first spring engagement element to permit the carrier to angularly deflect with respect to the first spring engagement element;
   wherein the sun gear is connected to one of the input member or the output member and the ring gear is connected to the other one of the input member or the output member.

2. The torsional vibration isolator for a motor vehicle of claim 1, wherein the input member is an engine drive component.

3. The torsional vibration isolator for a motor vehicle of claim 2, wherein the output member is a transmission input shaft.

4. The torsional vibration isolator for a motor vehicle of claim 3, wherein the sun gear is directly connected to the transmission input shaft.

5. The torsional vibration isolator for a motor vehicle of claim 2, further including a connection plate directly connected to the first spring engagement element and connected to the engine drive component.

6. The torsional vibration isolator for a motor vehicle of claim 5, further including a torque converter lock-up clutch plate connected to the connection plate.

7. The torsional vibration isolator for a motor vehicle of claim 6, further including a torque converter lock-up clutch piston which when applied connects the torque converter lock-up clutch plate to the engine drive component.

8. The torsional vibration isolator for a motor vehicle of claim 3, wherein the sun gear is connected to the engine drive component.

9. The torsional vibration isolator for a motor vehicle of claim 8, wherein the first spring engagement element is connected to the transmission input shaft.

10. The torsional vibration isolator for a motor vehicle of claim 1, wherein the input member is connected to a flex plate, and the flex plate is connected to a motor vehicle engine.

11. A torsional vibration isolator for a motor vehicle, comprising:
   an input member including an engine drive component;
   an output member defining a transmission input shaft;
   a component group connecting the input member to the output member, the component group including:
   a first spring engagement element connected to a ring gear;
   at least one pinion gear engaged to the ring gear;
   a sun gear engaged to the at least one pinion gear;
   a second spring engagement element connected to a carrier, the carrier also connected to the at least one pinion gear; and
   at least one spring contacting both the second spring engagement element and the first spring engagement element to permit the second spring engagement element and the carrier to angularly deflect with respect to the first spring engagement element.

12. The torsional vibration isolator for a motor vehicle of claim 11, wherein one of the sun gear or the ring gear is connected to the transmission input shaft.

13. The torsional vibration isolator for a motor vehicle of claim 12, wherein the other one of the sun gear or the ring gear is connected to the engine drive component.

14. The torsional vibration isolator for a motor vehicle of claim 11, further including a connection plate directly connected to the first spring engagement element.

15. The torsional vibration isolator for a motor vehicle of claim 14, wherein the connection plate is connected to the transmission input shaft.

16. The torsional vibration isolator for a motor vehicle of claim 14, wherein the connection plate is connected to the engine drive component.

17. The torsional vibration isolator for a motor vehicle of claim 14, further including a torque converter lockup clutch plate fixed to the connection plate.

18. A powertrain for a motor vehicle comprising:
   an engine disposed in the motor vehicle and having an engine output member connected to a flex plate;
   an automatic transmission connected to the engine having a transmission input shaft;
   a torque converter having a lockup clutch connected to the transmission input shaft of the automatic transmission; and
   a torsional vibration isolator connected between the engine output member and the transmission input shaft, the torsional vibration isolator including:
   a component group connecting the engine output member to the transmission input shaft, the component group including:
   a first spring engagement element connected to a ring gear;
   at least one pinion gear engaged to the ring gear;
   a sun gear engaged to the at least one pinion gear;
   a second spring engagement element connected to a carrier, the carrier also connected to the at least one pinion gear; and
   at least one spring contacting both the second spring engagement element and the first spring engagement element to permit the second spring engagement element and the carrier to angularly deflect with respect to the first spring engagement element;
   wherein the sun gear is connected to one of the engine output member or the transmission input shaft and the ring gear is connected to the other one of the engine output member or the transmission input shaft.

19. The powertrain of claim 18, wherein the first spring engagement element is also connected to a connection plate which is connected to the lockup clutch.

20. The powertrain of claim 18, further including a connection plate directly connected to the first spring engagement element and connected to the engine drive component.

* * * * *